United States Patent [19]

Fukushima et al.

[11] Patent Number: 5,089,966
[45] Date of Patent: Feb. 18, 1992

[54] ACTIVELY CONTROLLED AUTOMOTIVE SUSPENSION SYSTEM WITH IMPROVED DAMPING CHARACTERISTICS

[75] Inventors: Naoto Fukushima; Hirotsugu Yamaguchi; Yohsuke Akatsu; Sunao Hano; Kazunobu Kawabata, all of Kanagawa, Japan

[73] Assignee: Nissan Motor Company, Limited, Yokohama, Japan

[21] Appl. No.: 660,231

[22] Filed: Feb. 22, 1991

Related U.S. Application Data

[63] Continuation of Ser. No. 449,416, Dec. 15, 1989, abandoned, which is a continuation of Ser. No. 59,888, Jun. 9, 1987, abandoned.

[30] Foreign Application Priority Data

Jun. 10, 1986 [JP] Japan .................. 61-134218

[51] Int. Cl.$^5$ .......................... B60G 17/015
[52] U.S. Cl. .................. 364/424.05; 280/707
[58] Field of Search .............. 364/424.05; 280/707, 280/DIG. 1, 703; 267/64.15

[56] References Cited

U.S. PATENT DOCUMENTS

| | | | |
|---|---|---|---|
| 3,995,883 | 12/1976 | Glaze | 280/707 |
| 4,506,909 | 3/1985 | Nakishima | 267/64.15 |
| 4,625,993 | 12/1986 | Williams et al. | 280/707 |
| 4,700,971 | 10/1987 | Doi et al. | 280/707 |

FOREIGN PATENT DOCUMENTS 0193124 9/1986 European Pat. Off. .

Primary Examiner—Thomas G. Black
Attorney, Agent, or Firm—Foley & Lardner

[57] ABSTRACT

An actively controlled suspension system employs a pressure control valve which is operable in response to a control signal and controls fluid pressure in the fluid chamber of a hydraulic cylinder as a replacement for the conventional hydraulic shock absorber. The pressure control valve is associated with a controller which detects bounding and rebounding acceleration and stroke speed in bounding and rebounding motion for deriving a control signal to operate the pressure control valve to absorb vibration energy to be transmitted between a vehicle body and a suspension member.

11 Claims, 11 Drawing Sheets

ACTIVELY CONTROLLED AUTOMOTIVE SUSPENSION SYSTEM WITH IMPROVED DAMPING CHARACTERISTICS

This application is a continuation of application Ser. No. 07/449,416, filed Dec. 15, 1989, which is a continuation of application Ser. No. 07/059,888 filed June 9, 1987 now abandoned.

BACKGROUND OF THE INVENTION

1. Field of the Invention

The present invention relates generally to a suspension system for a vehicle. More specifically, the invention relates to an automotive suspension system with improved damping characteristics. Further particularly, the invention relates to a control system for an automotive suspension system, which actively controls suspension systems for suppressing attitude change, such as rolling, pitching, bouncing and so forth.

2. Description of the Background Art

Generally, a typical construction of a suspension assembly comprises a suspension coil and shock absorber and is interposed between a vehicle body and a suspension member supporting a vehicular wheel, in order to constitute an automotive suspension system with the suspension member The suspension coil spring generally resists against load applied to maintain the vehicle body and the road wheel in a predetermined positional relationship to each other. On the other hand, the shock absorber is intended to damp or absorb vibrations transmitted between the vehicle body and the road wheel The automotive suspension system may be further provided with a roll-stabilizer for suppressing vehicular rolling motion.

Some of the many kinds of automotive suspension systems include hydraulic circuits associated with fluid chambers in hydraulic circuits associated with fluid chambers in hydraulic shock absorbers for controlling balance between the fluid pressures in the fluid chambers according to the relative displacement between the vehicle body and road wheel. Such hydraulic circuits include a fluid pressure source supplying working fluid at a given pressure to the circuits, and pressure control valves. The pressure control valves hydraulically connect and disconnect the fluid pressure source to the fluid chambers of the hydraulic shock absorbers for controlling pressure supply. The pressure control valves are controlled by an electric or electronic control system which switches the various valve positions to selectively introduce or drain fluid pressure into or from the fluid chambers so as to generate a damping force which suppresses vehicle body and road wheel vibrations. Some of these suspension systems are known as actively controlled suspension systems control stiffness of the suspension systems in a positive manner depending upon vehicle driving condition. For example, in the active suspension control, the pressure control valves adjust fluid pressure in the fluid chambers for absorbing vibrations input from the suspension member for providing satisfactorily high riding comfort. The pressure control valves also adjust the fluid pressure in the associated fluid chambers to suppress attitude change when the vehicle experiences rolling, pitching or bouncing.

These conventional actively controlled suspension systems encounter various defects and have not been at all satisfactorily capable of suppressing vibrations or bouncing of the vehicle body in order to ensure riding comfort. Specifically, conventional systems produce damping force by means of an orifice in the hydraulic circuit. However, due to flow resistance through the orifice, fluid pressure differences between the fluid chambers in the shock absorber cannot be easily balanced. When the balance is disturbed, the shock absorber tends to transmit vibration of the road wheel to the vehicle body which degrades riding comfort.

In order to provide an improvement, a positively or actively controlled automotive suspension system has been proposed in European Patent First Publication 01 93 124, published on Sept. 3, 1986, and assigned to the common owner of the present invention. The proposed positively or actively controlled automotive suspension system comprises a hollow cylinder defining a chamber, a piston thrustingly received within the chamber of the cylinder and defining therein first and second fluid chambers, both filled with a working fluid, the piston being free to move axially with the chamber, a fluid pressure source, a hydraulic circuit connecting the first and second fluid chambers and the fluid pressure source, a pressure control valve disposed within the hydraulic circuit and adapted to selectively establish and block fluid communication between the first and second fluid chambers and the fluid pressure source, means responsive to relative displacement between a vehicle body and the road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

On the other hand, the conventional active suspension control has been discussed in Proceedings of the Institute of Mechanical Engineering (Britain) Vol. 185, page 558. Such active suspension control, as discussed, controls the vibration transmission ratio between the suspension member and the vehicle body on the basis of bounding and rebounding acceleration. In the disclosed control, the pressure control valve is controlled for varying fluid path area for changing pressurized fluid supply rate and drain rate for generating damping force against the input shock. For example, assume input vibration force $X_1$ is exerted on the suspension member. The piston in the hydraulic cylinder is driving in bounding and/or rebounding direction to cause change of fluid pressure in the hydraulic cylinder. According to this, the working fluid in the fluid chamber communicated with the pressure control valves varies at a speed determined by fluid path area in the pressure control valve. Since the pressure control valve has a throttle for limiting working fluid flow rate, the damping force is generated in the hydraulic cylinder. In such a conventional active suspension system, its transfer function $X_2/X_1$, where $X_2$ and $X_1$ respectively denote a displacement for a sprung weight and a displacement for an unsprung weight, is essentially equivalent to traditional passive suspension systems, because the former suspension system employs the same parallel arrangement of a damper and a spring.

However, in such conventional actively controlled suspension system, the tlow-control type servo valve has been employed for controlling the pressure in the hydraulic cylinder. Since such flow-control type servo valve controls working fluid flow rate instead of the working fluid pressure per se. accurate suspension control cannot be achieved unless the vibration transmission ratio transfer function is determined in a complex manner in relation to the fluid flow rate variation and the corresponding pressure change. This requires substantial capacity and high processing speed for the controller to satisfactorily control the suspension in an active manner. However, microprocessors for mounting the automotive vehicle have less capacity and processing speed than that required for performing active suspension control. Such conventional active suspension systems cannot decrease the vibration transmission ratio around a resonance frequency with regard to the sprung weight due to the previously noted damping force caused by the input vibration exerted on the suspension member.

In addition, as will be appreciated, the vehicle body and the suspension member vibrate in various vibration modes, such as pitching mode, rolling mode, bounding mode and so forth. Therefore, as long as suspension control is performed based on the bounding and rebounding acceleration at a single point on the vehicle, suspension control covering all of the vibration modes cannot be accomplished.

SUMMARY OF THE INVENTION

Therefore, it is an object of the present invention to provide an active control for an automotive suspension system, which is successful in suppressing vibrations in various vibration modes and can provide accurate control by employing a control valve which directly controls the pressure in the hydraulic cylinder.

Another object of the invention is to provide an active suspension control which successfully avoids the possibility of erroneous operation due to noise to be superimposed on sensor signals or depending upon the vehicular driving condition such as hill climbing.

In order to accomplish the aforementioned and other objects, an actively controlled suspension system, according to the present invention, employs a pressure control valve which is operable in response to a control signal and controls fluid pressure in the fluid chamber of a hydraulic cylinder as a replacement for the conventional hydraulic shock absorber. The pressure control valve is associated with a controller which detects bounding and rebounding acceleration and stroke speed in bounding and rebounding motion for deriving a control signal to operate the pressure control valve to absorb vibration energy to be transmitted between a vehicle body and a suspension member.

According to one aspect of the invention, an actively controlled suspension system for an automotive vehicle comprises a suspension assembly including a variable pressure chamber filled with a working fluid, a pressure source connected to the variable pressure chamber for supplying the pressurized working fluid, a pressure adjusting means, interposed between the variable pressure chamber and the pressure source, for adjusting fluid pressure in the variable pressure chamber, sensor means for monitoring vehicular attitude for producing a vehicular attitude indicating signal, and a controller receiving the vehicular attitude indicating signal for deriving a control signal to suppress an attitude change of the vehicle for controlling the pressure adjusting means.

According to another aspect of the invention, an actively controlled suspension system for an automotive vehicle comprises a suspension assembly provided for suspending a vehicle body on each vehicular wheel, the suspension assembly including a variable pressure chamber filled with a working fluid, a pressure source connected to the variable pressure chamber for supplying the pressurized working fluid, a pressure adjusting means, interposed between each of the variable pressure chambers and the pressure source, for adjusting fluid pressure in the variable pressure chambers, sensor means of monitoring essentially vertical motion of each suspended section of the vehicle body where one of the vehicular wheels is provided, the sensor means producing vertical motion indicating signals respectively indicative of vertical motions of respective suspended sections, and a controller receiving the vertical motion indicating signals for deriving control signals to suppress vertical motion at respectively corresponding suspended sections of the vehicle for controlling the pressure adjusting means to adjust pressure in respective variable pressure chambers.

According to a further aspect of the invention, an actively controlled suspension system for an automotive vehicle comprises a suspension assembly provided for suspending a vehicle body on each vehicular wheel, the suspension assembly including a variable pressure chamber filled with a working fluid, a pressure source connected to the variable pressure chamber for supplying the pressurized working fluid, a pressure adjusting means, interposed between each of the variable pressure chambers and the pressure source, for adjusting fluid pressure in the variable pressure chambers, sensor means for monitoring acceleration in essentially vertical motion in bounding and rebounding directions of each suspended section of the vehicle body where one of the vehicular wheels is provided, the sensor means producing vertical motion indicating signals respectively indicative of vertical motions of respective suspended sections, and a controller receiving the vertical motion indicating signals for detecting vehicular attitude change for deriving control signals to suppress vehicular attitude change for deriving control signals to suppress vehicular attitude change at respectively corresponding suspended sections of the vehicle for controlling the pressure adjusting means to adjust pressure in respective variable pressure chambers.

In the preferred embodiment, each of the suspension assembly includes a suspension member rotatably supporting the vehicular wheel, and each of the variable pressure chambers is disposed between the suspension member and the corresponding one of suspended sections of the vehicle body, and wherein the variable pressure chamber varies the fluid pressure therein in response to relatively high frequency vibration input from the suspension member in order to absorb vibration energy. In practice, the sensor means is provided on the vehicle body for monitoring an acceleration of bounding and rebounding motion of the vehicle body for producing a bounding and rebounding motion acceleration indicating signal as the vehicular attitude indicating signal. The controller derives a bounding and rebounding motion speed based on the bounding and rebounding acceleration indicating signal values for detecting bounding and rebounding motion at respective suspended sections of the vehicle body and detects the vehicular attitude change based on the bounding and rebounding acceleration and the bounding and rebounding motion speed for deriving the control signals. The controller derives the bounding and rebounding motion speed by integrating the bounding and rebounding acceleration indicating signal value.

In the alternative, the actively controlled suspension system may further comprises a reset signal generator means associated with the controller, the reset signal generator means detecting a vehicular driving condition satisfying a predetermined reset condition for outputting a reset signal for resetting the integrated value of the bounding and rebounding acceleration indicating signal value.

The controller derives a bounding and rebounding acceleration dependent component of the control signal based on the bounding and rebounding acceleration indicating signal value and a given first gain and a bounding and rebounding motion speed dependent component of the control signal based on the bounding and rebounding motion speed and a given second gain. The control signal is a sum of the bounding and rebounding acceleration dependent component and the bounding and rebounding motion speed dependent component. The actively controlled suspension system further comprises a manually operable means for adjusting at least one of the first and second gains.

Preferably, the controller derives the control signals for respective pressure adjusting means independently of each other.

BRIEF DESCRIPTION OF THE DRAWINGS

In the drawings:

FIGS. 3(A) and 3(B) are enlarged sections showing the detail of the hydraulic pressure control valve of FIG. 2, in which, FIG. 3(A) shows the valve position hardening the shock absorber and FIG. 3(B) shows the valve position softening the shock absorber;

DESCRIPTION OF THE PREFERRED EMBODIMENT

Figure 1:
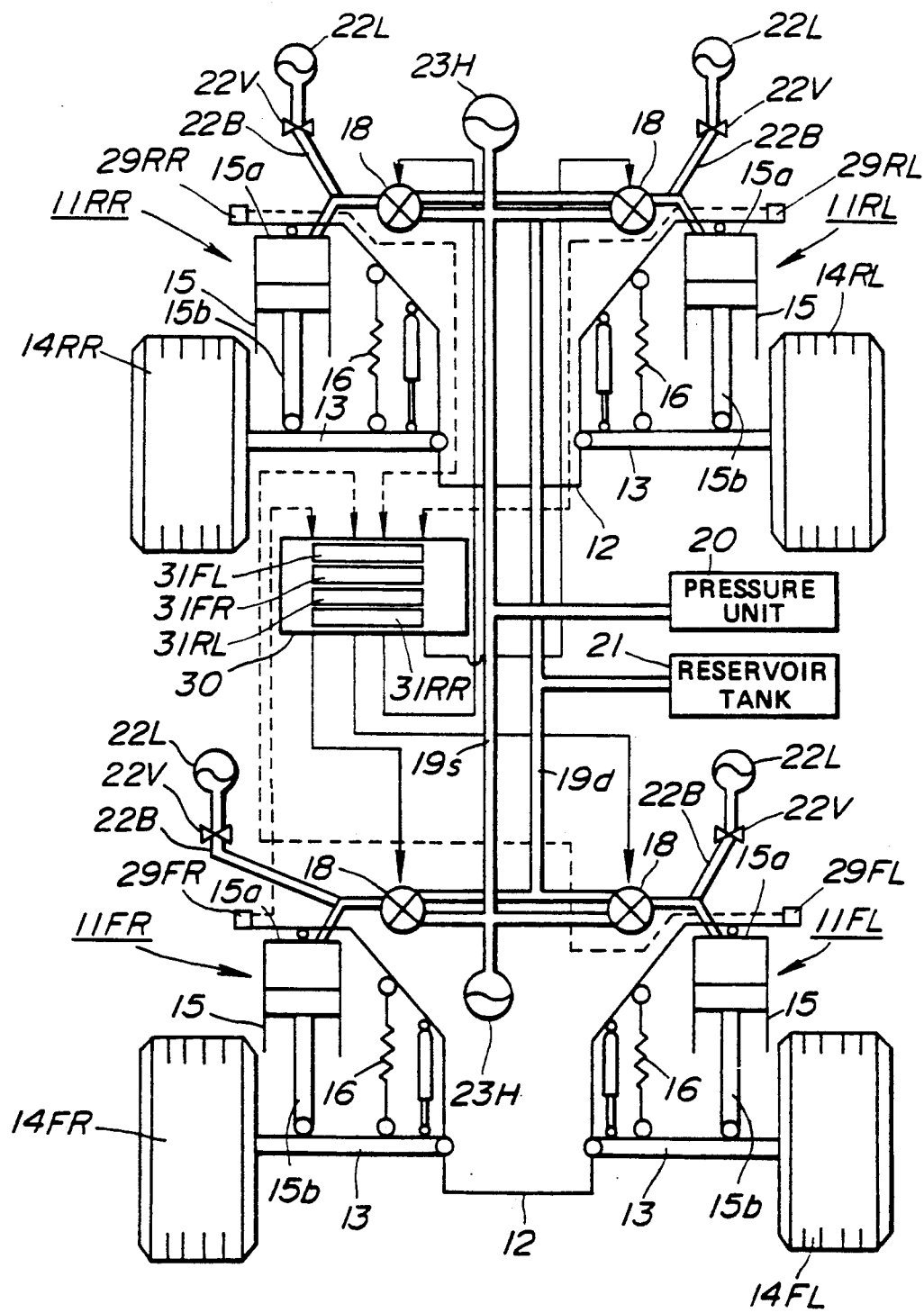
FIG. 1 is a diagrammatical illustration showing the overall construction of the preferred embodiment of an automotive suspension system with a control system actively controlling the suspension system according to the present invention.

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assemble 15 has a hydraulic cylinder 15A which serves as an actuator, and a coil spring 16. The construction of the hydraulic cylinder 15A will be hereinbelow described in detail with respect to FIG. 2.

It should be appreciated that, in the shown embodiment, the coil spring 16 is not necessary to damp dynamic kinematic energy and is mounted between the vehicle body and the suspension member in a manner to support only the static load exerted between the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one of the vehicle body 12 and the suspension member 13. On the other hand, the end of the piston rod 15b is connected to the suspension member 13 which is connected to the vehicle body 12.

The hydraulic cylinder 15A of the suspension assembly 15 is connected to a hydraulic pressure source unit via a hydraulic circuit which includes pressure control valve 18. The pressure control valve 18 is electrically operable and connected to a control unit 30. The hydraulic circuit includes a supply line 19s and a drain line 19d. High pressure accumulators 23H are connected to the supply line 19s and low pressure accumulators 22L are connected between the pressure control valves 18 and associated hydraulic cylinder 15. The pressure source unit comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

As seen in FIG. 1, the low pressure accumulators 22L are connected to a branched pressure line 22B connected to a pressure line between the pressure control valves 18 and the upper fluid chamber 15d of the hydraulic cylinder 15A. A throttle valve 22V is inserted between the junction of the branched, pressure line 22B and the pressure line of the low pressure accumulators 22L. The throttle valve 22V has a fixed throttling rate.

Figure 2:
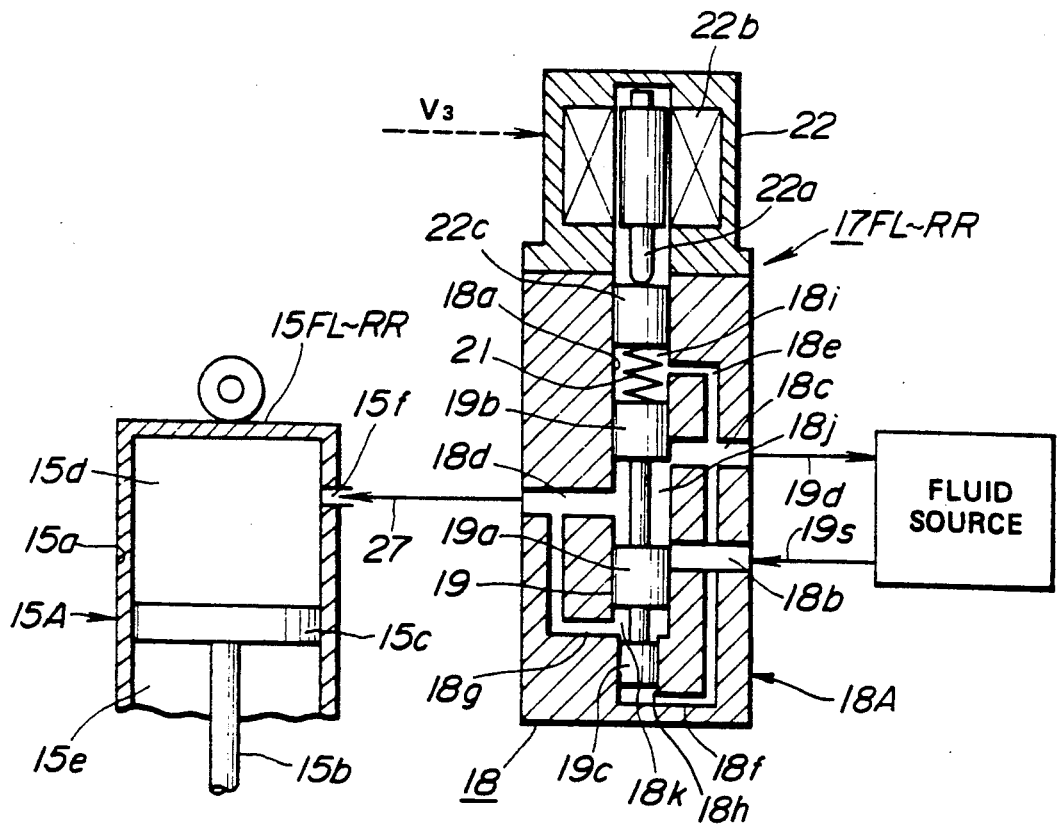
FIG. 2 is a section of one example of hydraulic shock absorber in combination with a hydraulic pressure control valve included in an actively controlled suspension system according to the invention.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and thereby communicated with the upper fluid chamber 15d. On the other hand, the pressure chamber 18j shifts according to shifting of the valve spool 19 to selectively communicate the outlet port 18d with either the inlet port 18b or the drain port 18c; On the other hand, a pressure control chamber 18k is defined between the first and third lands 19a and 19c. The pressure control chamber 18k is in communication with the outlet port 18d via a pilot path 18g. A bias spring 21 is interposed between the actuator piston 22c and the valve spool 19. The actuator piston 22c contacts with an actuator rod 22a of an electrically operable actuator 22 which comprises an electromagnetic solenoid. The solenoid 22 comprises a proportioning solenoid.

Figure 3:
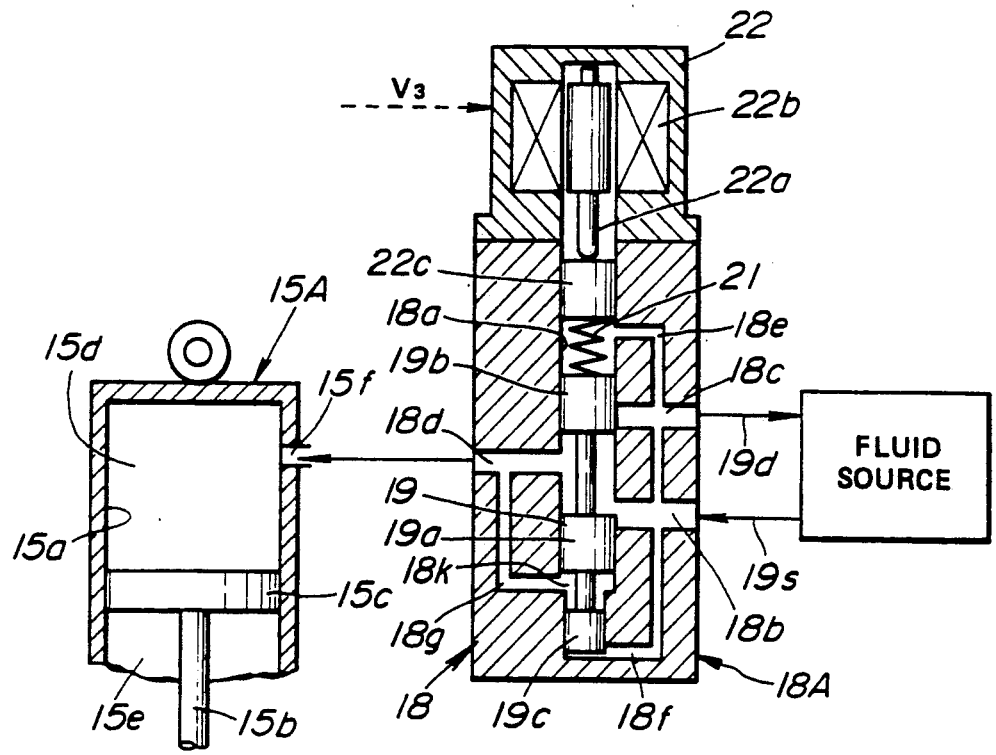
Figure 3:
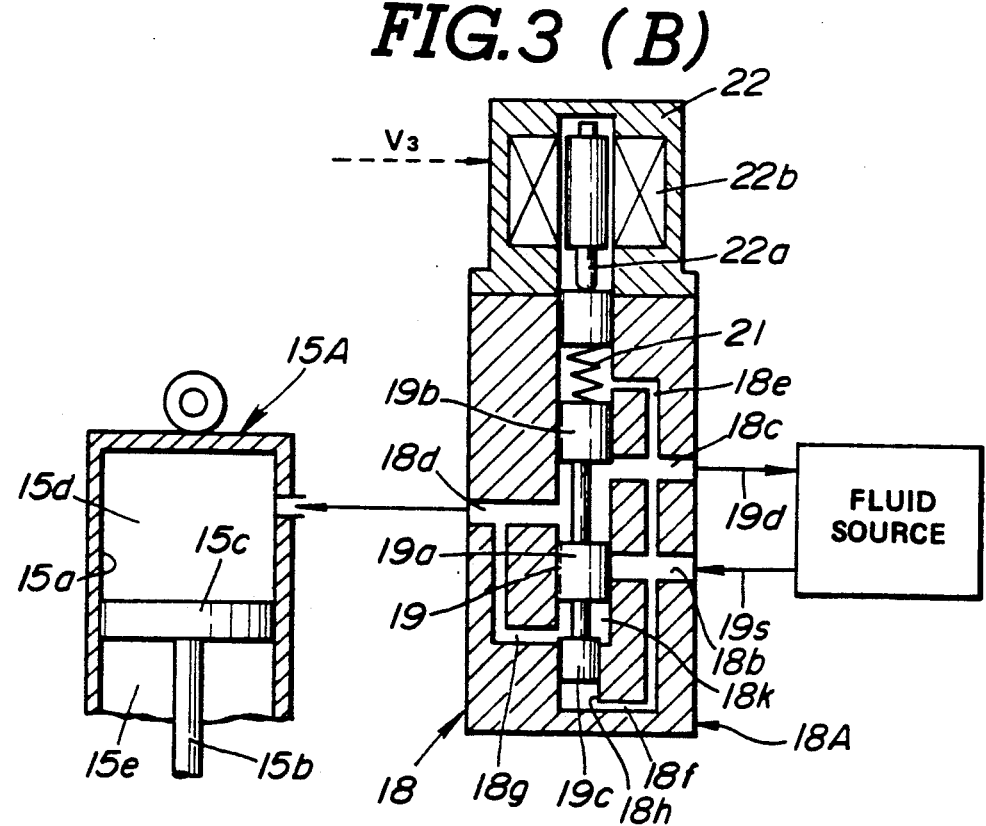

In order to increase the supply pressure of the working fluid, the spool valve 19 is shifted to the position shown in FIG. 3(A) to increase path area at a throttle at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the throttle of the inner end of 18c the drain port 18 which is normally blocked by means of the land 19b of Construction of the pressure control valves should not be restricted to the construction as illustrated in FIGS. 2, 3(A) and 3(B) but can be replaced with any appropriate constructions. For example, the pressure control valve constructions as illustrated in European Patent First Publication 01 93 124, set forth above, can also be employed. The disclosure of the aforementioned European Patent First Publication 01 93 12 is herein incorporated by reference for the sake of disclosure.

Figure 4:
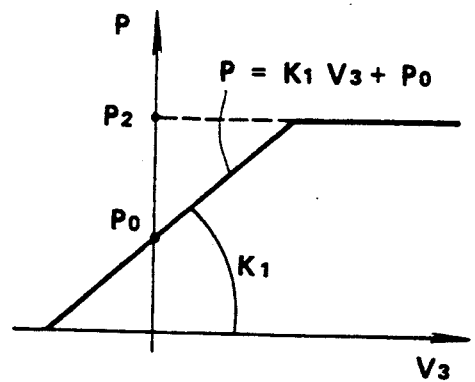
FIG. 4 is a graph showing variation of a hydraulic pressure to be supplied to a pressure control value according to variation of drive signal voltage.

As seen from FIG. 2, the proportioning solenoid 22 comprises the actuator rod 22a and a solenoid coil 22b. The solenoid coil 22b is energized by suspension control signal $V_3$ from the controller 30. In the shown embodiment of the pressure control valve, the working fluid pressure P at the outlet port 18d is variable according to the characteristics shown in FIG. 4. Namely, when the control signal $V_3$ as represented by the suspension control signal is zero, the pressure P at the outlet port 18d becomes $P_0$ determined according to a predetermined offset pressure $P_0$. When the suspension control signal value of positive value increases, the fluid pressure P at the outlet port 18d increases with a predetermined proportioning gain $K_1$. Namely, by increasing the suspension control signal $V_3$, the actuator rod 22a is driven downwardly in FIG. 2 at a magnitude toward the position of FIG. 3(A) to achieve increasing of the fluid pressure with the predetermined proportioning gain $K_1$. Thereafter, when the control signal value $V_3$ is subsequently increased, the fluid pressure P at the outlet port 18d reaches the output pressure $P_2$ of the pressure unit 20. On the other hand, when the suspension control signal value $V_3$ decreases, the pressure P decreases by shifting of the actuator rod 22a toward the direction to FIG. 3(B).

The actuator rod 22a of the proportioning solenoid 22 is associated with the actuator piston 22c. Contact between the actuation rod 22a and the actuator piston 22c can be maintained by the resilient force of the bias spring 21 which normally biases the actuator piston toward the actuation rod. On the other hand, the spring force of the bias spring 21 is also exerted on the valve spool 19 to constantly bias the valve spool downwardly in FIG. 2. The valve spool 19 also receives upward hydraulic force from the pressure control chamber 18k. Therefore, the valve spool 19 is oriented at the position in the valve bore at the position where the downward bias of the bias spring 21 balances with the upward hydraulic force of the pressure control chamber 18k.

When bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 21 and the upward hydraulic force of the pressure control chamber 18k. This causes upward movement of the valve spool 19 against the spring force of the bias spring 21, as shown in FIG. 3(B). As a result, path area of the drain port 18c increases and the inlet port 18b becomes blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body.

When rebounding motion occurs at the suspension member, the piston 15c of the hydraulic cylinder 15A shifts downwardly to cause decreasing of the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and the drain port 18c becomes blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Here, since no flow resisting element, such as an orifice or throttling valve, is disposed between the fluid reservoir 21 and the drain port 18c, no damping force against the upward motion of the piston 15c in the hydraulic cylinder 15A will be produced in response to the bounding motion of the suspension member. Since the damping force exerted on the piston 15c may serve to allow transmission of the part of bounding energy to the vehicle body to cause a rough ride, the shown embodiment of the suspension system may provide a satisfactorily high level of riding comfort by completely absorbing the bounding and rebounding energy set forth above.

In order to enable the controller 30 to perform suspension control in response to a change of attitude of the vehicle body, the preferred embodiment of the active suspension control system employs bounding and rebounding acceleration sensors 29FL, 29FR, 29RL and 29RR. The bounding and rebounding acceleration sensors 29FL, 29FR, 29RL and 29RR are respectively oriented immediately above respectively associated front-left, front-right, rear-left and rear-right wheels 14FL, 14FR, 14RL and 14RR. The bounding and rebounding acceleration sensors 29FL, 29RL, 29RR and 29RR monitor vertical motion acceleration of the associated sections of the vehicle body in bounding and rebounding directions and thus produce bounding and rebounding acceleration indicating sensor signals $a_{FL}$, $a_{FR}$, $a_{RL}$ and $a_{RR}$. The bounding and the rebounding acceleration indicating sensor signals $a_{FL}$, $a_{FR}$, $a_{RL}$ and $a_{RR}$ are variable of the signal values depending upon direction of the motion of the associated position of the vehicle body and depending upon the magnitude of the acceleration. In the shown embodiment, the bounding and rebounding acceleration sensors 29FL, 29FR, 29RL and 29RR generate positive bounding and rebounding acceleration indicating sensor signals, the positive value of which is variable depending upon the magnitude of acceleration in bounding direction at the respective associated positions of the vehicle body. On the other hand, the bounding and the rebounding acceleration sensors 29FL, 29FR, 29RL and 29RR produce the bounding and rebounding acceleration indicating sensor signals $a_{FL}$, $a_{FR}$, $a_{RL}$ and $a_{RR}$ with negative values representative of magnitude of rebounding accelerations at respective positions.

Figure 5:
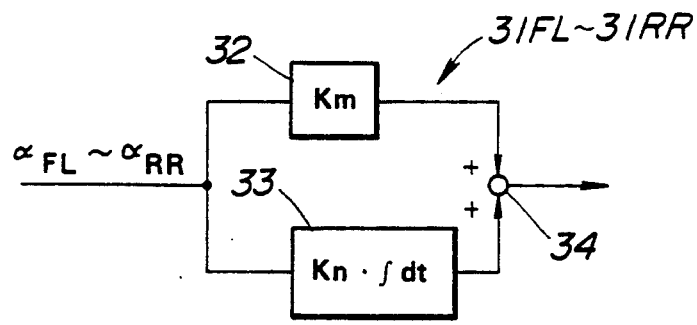
FIG. 5 is a schematic block diagram of one embodiment of the control sections in a controller of the first embodiment of the active suspension control system of FIG. 1.

In order to facilitate suspension controls for respective front-left, front-right, rear-left and rear-right suspension systems 11FL, 11FR, 11RL and 11RR, independently of each other, the controller 30 is composed of front-left control section 31FL, front-right control section 31FR, rear-left control section 31RL and rear-right control section 31RR. As shown in FIG. 5, each of the front-left, front-right, rear-left and rear-right control sections 31Fl, 31FR, 31RL and 31RR comprises a gain derivation stage or bounding and rebounding acceleration dependent value derivation stage 32 which derives a bounding and rebounding acceleration dependent value by multiplying the bounding and rebounding acceleration indicating signal value $a_{FL}$, $a_{FR}$, $a_{RL}$ and $a_{RR}$ with a predetermined gain value Km, an arithmetic stage 33, and an adder stage 34. The arithmetic stage 33 derives a bounding and rebounding stroke speed dependent value by multiplying an integrated value of the bounding and rebounding acceleration indicating signal value with a predetermined gain Kn. The adder stage 34 calculates a sum value of the outputs of the gain deriving stage 32 and the arithmetic stage 33 to output an adder signal $V_{4FL}$, $V_{4FR}$, $V_{4RL}$ and $V_{4RR}$ representative of the sum value and consequently to output the suspension control signal $V_{3FL}$, $V_{3FR}$, $V_{3RL}$ and $V_{3RR}$ to the pressure control valves 18.

While the vehicle travels smoothly or steadily on a smooth road, in straight, vehicular rolling, pitching and bounding will never occur. In this condition, the bounding and rebounding acceleration indicating sensor signal values $a_{FL}$, $a_{FR}$, $a_{RL}$ and $a_{RR}$ of the bounding and rebounding acceleration sensors 29FL, 29FR, 29RL and 29RR are maintained at zero. This zero value of the bounding and rebounding acceleration indicating sensor signals $a_{FL}$, $a_{FR}$, $a_{RL}$ and $a_{RR}$ is input to respectively corresponding front-left, front-right, rear-left and rear-right control sections 31FL, 31FR, 31RL and 31RR. Since the input values are zero, the outputs of the gain deriving stages 32 and the arithmetic stages 33 of respective control sections 31FL, 31FR, 31RL and 31RR are maintained at zero. Therefore, the adder signals $V_{4FL}$, $V_{4FR}$, $V_{4RL}$ and $V_{4RR}$ output from respective adder stages 34 are held at zero.

As set forth, while the suspension control signal value is zero, the proportioning solenoid coil 22b of the proportioning solenoid 22 is energized to provide the offset pressure $P_0$ to the upper fluid chamber 15d of the hydraulic cylinder 15A via the outlet port 18d.

As set forth, the downward force exerted to the valve spool 19 from the bias spring 21 and the upward hydraulic pressure in the pressure control chamber 18k balances in each pressure control valve 18. At this position, when relatively high frequency and small magnitude bounding and/or rebounding vibration is input from the suspension member, the valve spool 19 vibratingly shifts in a manner set forth above to absorb vibration energy. This successfully prevents the high frequency and small magnitude bounding and rebounding vibration from being transmitted to the vehicle body. Therefore, satisfactorily high riding comfort can be achieved.

On the other hand, when vehicle driving behavior causes substantial change in vehicular attitude to cause rolling, pitching or bounding, respective bounding and rebounding acceleration indicating sensor signal values $\alpha_{FL}$, $\alpha_{FR}$, $\alpha_{RL}$ and $\alpha_{RR}$ vary. Assuming the sensor signal values of respective bounding and rebounding acceleration indicating sensor signals $\alpha_{FL}$, $\alpha_{FR}$, $\alpha_{RL}$ and $\alpha_{RR}$ are $\alpha_{fl}$, $\alpha_{fr}$, $\alpha_{rl}$ and $\alpha_{rr}$, the output values of respective gain deriving stages 32 of the front-left, front-right, rear-left and rear-right control sections 31FL, 31FR, 31RL and 31RR become respectively $(\alpha_{fl} \times Km)$, $(\alpha_{fr} \times Km)$, $(\alpha_{rl} \times Km)$ and $(\alpha_{rr} \times Km)$. On the other hand, based on respective bounding and rebounding acceleration indicating sensor signal values $\alpha_{fl}$, $\alpha_{fr}$, $\alpha_{rl}$ and $\alpha_{rr}$, the bounding and rebounding stroke speeds $Vs_{FL}$, $Vs_{FR}$, $Vs_{RL}$ and $Vs_{RR}$ are derived in the arithmetic stages 33 of respective front-left, front-right, rear-left and rear-right control sections 31FL, 31FR, 31RL and 31RR. In practice, respective bounding and rebounding stroke speed Vs is derived as an integrated value $\int \alpha_{FL}dt$, $\int \alpha_{FR}dt$, $\int \alpha_{RL}dt$ and $\int \alpha_{RR}dt$ of the bounding and rebounding acceleration indicating signal values. In the arithmetic stage 33, also derived is the stroke speed dependent value on the basis of the bounding and rebounding stroke speed indicating values $Vs_{FL}$, $Vs_{FR}$, $Vs_{RL}$ and $Vs_{RR}$ and the predetermined gain Kn. The adder stages 34 of respective front-left, front-right, rear-left and rear-right control sections 31FL, 31FR, 31RL and 31RR derive sum values serving as the adder signals $V_4$. Note that the adder signal is different from the control signal for the pressure control valves 18. Assuming that the acceleration indicating sensor signal value $\alpha_{FR}$ is increased, the adder signal $V_{4FR}$ is also increased as appreciated from FIG. 5. At this time, the control signal $V_{3FR}$ is decreased as described hereinbelow in detail with reference to FIG. 6. An exciting current for the solenoid 27 included in the front-right pressure control valve 18 is also decreased, thereby decreasing the fluid pressure in the upper fluid chamber 15d. As a result, the hydraulic cylinder 15A (associated with the front-right wheel 14FR) is softened. Conversely, assuming that the acceleration indicating sensor signal $\alpha_{FR}$ is decreased, the adder signal $V_{4FR}$ is decreased and the control signal $V_{3FR}$ is increased. The exciting current for the solenoid 22 included in the front-right pressure control valve 18 is also increased, thereby increasing the fluid pressure in the upper fluid chamber 15d. As a result, the hydraulic cylinder 15A is hardened.

For example, when right-hand steering operation is performed during vehicle travel, leftward centrifugal force may be exerted on the vehicle to cause shifting of the gravity center leftwardly. As a result, the left side of the vehicle is lowered and right side is raised to cause vehicular rolling. Therefore, the positive bounding and rebounding acceleration indicating sensor signals $\alpha_{FR}$ and $\alpha_{RR}$ are produced from front-right and rear-right bounding and rebounding acceleration sensors 29FR and 29RR. On the other hand, the negative bounding and rebounding acceleration indicating sensor signals $\alpha_{FL}$ and $\alpha_{RL}$ are output from the front-left and rear-left bounding and rebounding acceleration sensors 29FL and 29RL. The gain derivation stage 32 of respective front-right and rear-right control sections 31FL and 31RR thus output positive stroke acceleration dependent values. The gain deriving stage 32 of the front-left and rear-left control sections 29FL and 29RL derives the negative stroke acceleration dependent values. Similarly, the arithmetic stages 33 of respective control sections derive bounding and rebounding stroke speed and thereby derive the bounding and rebounding stroke speed dependent values. These bounding and rebounding stroke speed dependent values in the front-right and rear-right control sections 31FR and 31RR are positive and that of the front-left and rear-left control sections 29FL and 29RL become negative.

Figure 6:
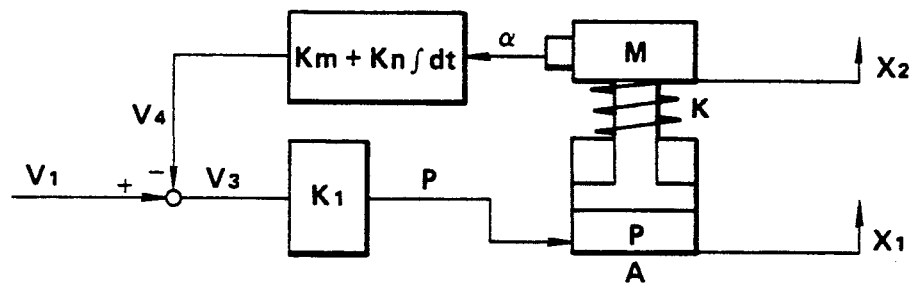
FIG. 6 is a schematic block diagram of a feedback system in the first embodiment of the active suspension control system of FIGS. 1 through 5.

Therefore, the adder signals for the front-rear and rear-rear suspension systems become positive and consequently the suspension control signals for the front-rear and rear-rear suspension systems become negative as appreciated from the equation $V_3$ (control signal)=$V_1 - V_4$ (adder signal) as seen in FIG. 6. As a result, the front-rear and rear-rear suspension systems become negative. Conversely, the front-left and rear-left suspension systems become positive.

In response to the negative suspension control signals for the front-right and rear-right suspension systems, the proportioning solenoid coils 22a of the pressure control valves 18 of the front-right and rear-right suspension systems are energized at reduced magnitude to shift the spool valves for blocking the inlet ports and establishing communication between the fluid chambers 15d and the drain ports 18c. On the other hand, in response to the positive suspension control signals, the solenoid coils 22a of the pressure control valves 18 of the front-left and rear-left suspension systems are energized at increased magnitude for shifting to increase the path area for introducing the pressure into the fluid chambers 15d of the hydraulic cylinders 15A to harden the front-left and rear-left suspension systems. As will be appreciated, with the suspension control set forth above, vehicular rolling can be successfully reduced.

Here, assuming that:

the mass of the vehicle body is M,
the spring coefficient of the coil spring 16 is K,
the working fluid pressure in the fluid chamber 15d is P,
the effective upper surface area of the piston 15c is A,
the adder signal value is $V_4$,
a target vehicle height is $V_1$,
a difference between the target height $V_1$ and the adder signal value $V_4$ is $V_3$, a gain of the pressure control valve 18 is $K_1$, the magnitude of displacement of the suspension member is $x_1$, and
magnitude of displacement of the vehicle body is $x_2$, the equivalent circuit to the feedback system of the controller may be illustrated as shown in FIG. 6. The inertia resistance $Mx2$ of the vehicle body is determined by the resistance component of the coil spring 16 and a resistance component of the hydraulic cylinder 15A and can be illustrated as the following equation (1):

$$\ddot{M}x_2 = K(x_1 - x_2) + P \cdot A \ldots \quad (1)$$

On the other hand, the difference $V_3$ can be illustrated as the following equation (2):

$$V_3 = V_1 - V_4 \ldots \quad (2)$$

In addition, the fluid pressure P of the upper fluid chamber 15d can be illustrated as the following equation (3):

$$P = K_1 \cdot V_3 \ldots \quad (3)$$

As set forth, the adder signal value may be illustrated by the following equation (4):

$$V_4 = \ddot{x}_2 \times Km + x_2 \ldots \quad (4)$$

where $\ddot{x}_2$ (corresponding to $a$) represents bounding and rebounding acceleration of the vehicle body and $\dot{x}_2$ (corresponding to Vs) represents the bounding and rebounding stroke speed of the vehicle body. with the components in the equations (2) to (4), the $x_2$ may be illustrated as:

$$\begin{aligned} \ddot{M}x_2 &= K(x_1 - x_2) + K_1(V_1 - Km\ddot{x}_2 Kn \cdot \dot{x}_2)A \quad (5)\\ &= -(K_1 Km \cdot \ddot{A}x_2 + K_1 n \cdot \dot{A}x_2 + K \cdot x_2) + \\ & \quad K \cdot x_1 + K_1 \cdot A \cdot V_1 \end{aligned}$$

The aforementioned equation (5) can be modified by Laplace transformation, as the following equation (6):

$$MS^2 x_{2(S)} = -(K_1 \cdot Km \cdot A \cdot S^2 \cdot x_{2(S)} + K_1 \cdot Kn \cdot A \cdot S \cdot x_{2(S)} + K \cdot x_2) + K \cdot x_{1(S)} + K_1 \cdot AV_1 \ldots \quad (6)$$

Assuming the target vehicle height $V_1$ is zero and disregarding the lateral accelerations, the vibration transmission characteristics (transfer function) $X_{2(S)}/X_{1(S)}$ can be illustrated based on the above equation (6), as following equation (7):

$$X_{2(S)}/X_{1(S)} = K/\{(M + K_1 \cdot Km \cdot A) \cdot S^2 + K_1 \cdot Kn \cdot A \cdot S + K\} \ldots \quad (7)$$

Figure 7:
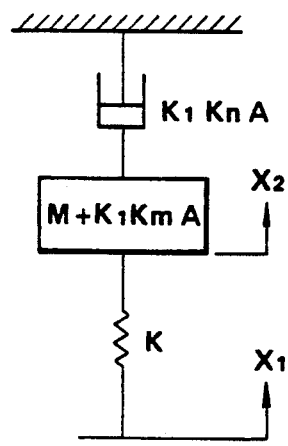
FIG. 7 is an illustration of an equivalent model to be utilized for discussion of operation of the first embodiment of the active suspension control system of FIGS. 1 through 5.

The equivalent model of the foregoing equation (7) has been shown in FIG. 7.

Figure 8:
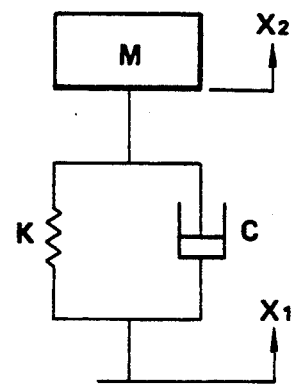
FIG. 8 is a comparative illustration of the equivalent model of the conventional passive suspension system.

The construction of the preferred embodiment of the active suspension system according to the invention will be compared with the conventional type passive suspension system which has been illustrated in FIG. 8. As set forth above in the shown embodiment, the suspension control signal value is determined on the basis of the bounding and rebounding acceleration $a$ and bounding and rebounding stroke speed Vs which is derived on the basis of the bounding and rebounding acceleration. In this case, the vibration absorbing coefficient $K_1 KnA$ of the hydraulic cylinder 15A is disposed between the equivalent mass $(M + K_1 \cdot Km \cdot A)$ of the vehicle body (spring mass) and stationary section, i.e. the ground. Therefore, by adjusting the fluid pressure P in the upper fluid chamber 15d, the equivalent mass $(M + K_1 \cdot Km \cdot A)$ can be directly controlled. The vibration transmission characteristics $X_{2(S)}/X_{1(S)}$ with respect to the vibration frequency is shown by the curve $l_1$ in FIG. 9.

Figure 9:
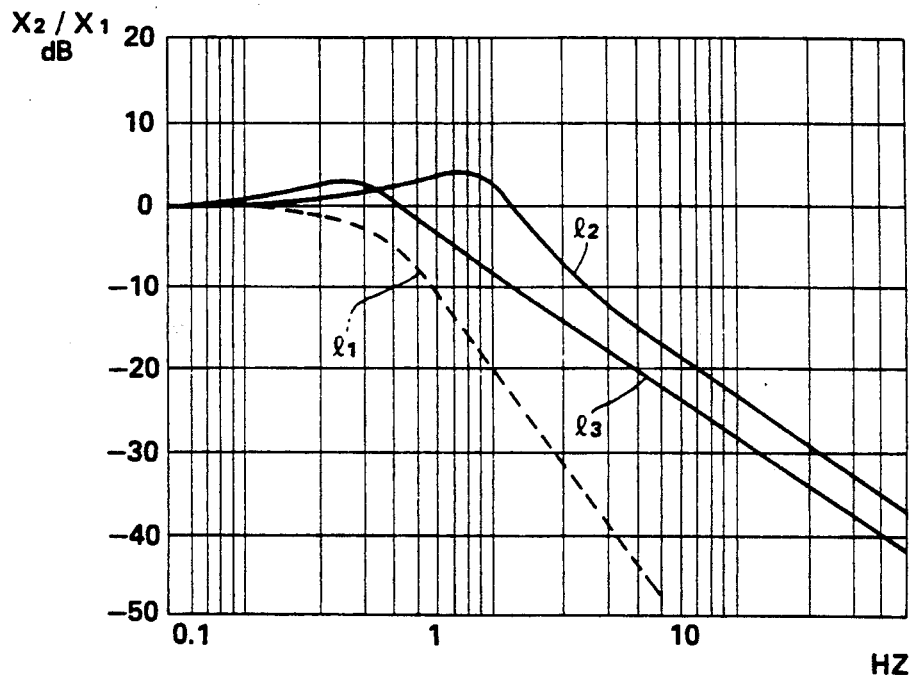
FIG. 9 is a graph showing vibration transmission characteristics in relation to vibration frequency.

As will be seen from FIG. 8, in the conventional passive suspension system, the spring coefficient K of the suspension coil spring and damping coefficient C of the shock absorber are disposed in parallel between the mass of the vehicle body to support the vehicle body with forces exerted in parallel. In this case, the vibration transmission characteristics with respect to the vibration frequency can be illustrated by the curve $l_2$ in FIG. 9. In FIG. 9, the curve $l_3$ represents the vibration transmission characteristics with respect to the vibration frequency of the conventional active suspension system as set out in the introduction of the disclosure. As will be seen from FIG. 9, the conventional passive suspension system and the conventional active suspension system had peak of vibration transmission at around the resonating frequency, i.e. 1 Hz, of the spring. To the contrary, according to the shown embodiment, vibration transmission can be substantially reduced even at the resonance point of the spring.

Therefore, the shown embodiment may achieve significantly improved riding comfort. On the other hand, the preferred embodiment of the active suspension control system set forth above also may achieve satisfactorily high driving stability by suppressing change of attitude of the vehicle. Though the discussion is given only for suppressing vehicular rolling in response to steering operation, the shown embodiment of the active suspension system is successful in suppressing pitching and bouncing motions of the vehicle.

Figure 10:
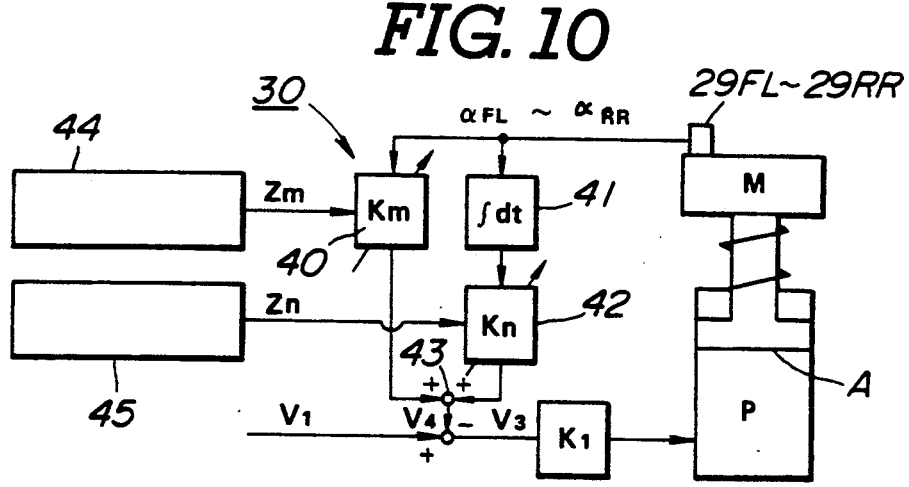
FIG. 10 is a schematic block diagram of the second embodiment of the control section in the controller of the active suspension control system according to the invention.

FIG. 10 shows the second preferred embodiment of the active suspension control system according to the invention. This embodiment allows variation of gains Km and Kn by means of gain setting stages 44 and 45.

The gain setting stage 44 is connected to the bounding and rebounding acceleration dependent value deriving stage 40 which corresponds to the gain deriving stage 32 of the former embodiment. On the other hand, the gain setting stage 45 is connected to a bounding and rebounding stroke speed dependent value derivation stage 42. The bounding and rebounding stroke speed dependent value derivation stage 42 is coupled with an integrator stage 41 to constitute the arithmetic stage 33 of the former embodiment. The gain setting stages 44 and 45 are manually operable to output set gain indicating signals Zm and Zn to respectively associated bounding and rebounding acceleration dependent value derivation stage 40 and the bounding the rebounding stroke speed dependent value derivation stage 42. The bounding and rebounding acceleration dependent value derivation stage 40 is responsive to the set gain indicating signal Zm to vary the gain Km according to the input set gain indicating signal value. Similarly, the bounding and rebounding stroke speed dependent value derivation circuit 42 is responsive to the set gain indicating signal Zn to change gain value Kn according to the set gain indicating signal value.

Figure 11:
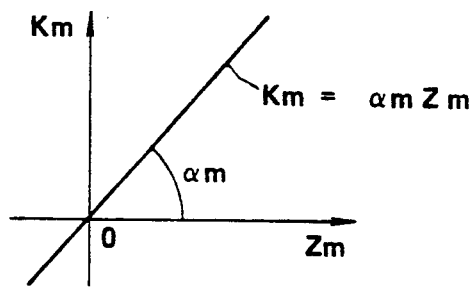
FIG. 11 is a graph showing variation of gain for determining bounding and rebounding acceleration dependent value, in relation to equivalent mass of the vehicle body.
Figure 12:
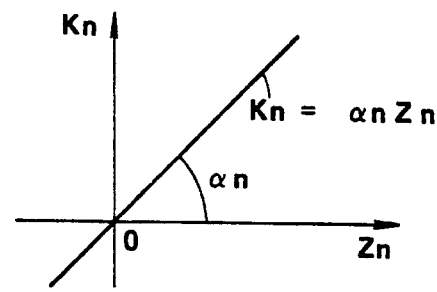
FIG. 12 is a graph showing variation of gain for determining bounding and rebounding stroke speed dependent value, in relation to the damping coefficient of the suspension system.

Variation of the gain sets in the gain setting stages 44 and 45 is illustrated in FIGS. 11 and 12. As will be seen from FIG. 11, the gain Km in the bounding and rebounding acceleration dependent value derivation stage 40 is determined as a function of the set gain indicating signal value Zm which serves as equivalent mass control signal. The set gain indicating signal value Zm is multiplied by a given constant $a_m$ which represents the ratio of increasing of the gain value Km relative to increasing of the set gain indicating value Zm. On the other hand, as shown in FIG. 12, the gain value Kn is determined as a function of the set gain indicating signal value Zn which serves as the absorption coefficient control signal. The gain value is derived by multiplying the set gain indicating siqnal value Zn by a qiven constant an which represents the variation ratio of the gain value Kn relative to variation of the set gain indicating signal value Zn.

In the preferred construction, the gain setting stages 44 and 45 include manually operable gain selector switches located adjacent the driver,s seat. Therefore, the gain set in the gain setting stages 44 and 45 can be manually adjusted by the driver. This will allow the suspension characteristics of the active suspension system to be adjusted to suit the driver.

Figure 13:
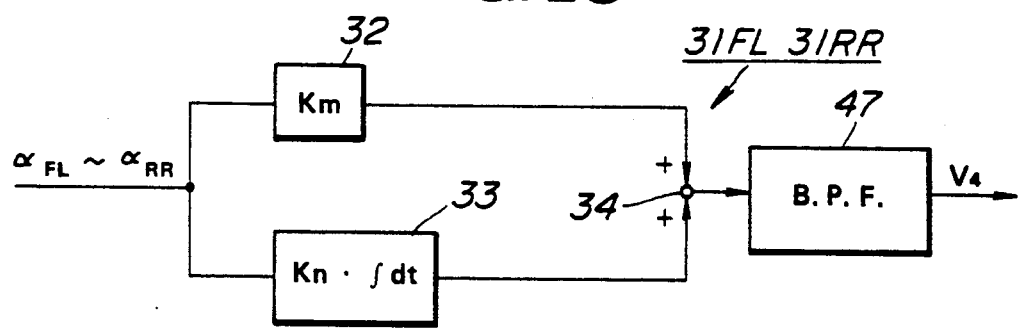
FIG. 13 is a schematic block diagram of the third embodiment of the control section in the controller of the active suspension control system according to the invention.

FIG. 13 shows the third preferred embodiment of the active suspension control system according to the invention. In this embodiment, on the basis of the bounding and rebounding acceleration dependent values and the bounding and rebounding stroke speed dependent values, the controller outputs the control signals $V_3$ to the respective pressure control valves 18; only for the vibration within a frequency range in the resonance frequency range of the vehicle which is the natural frequency determined by the mass weight of the vehicle body and spring coefficient of the suspension system. For this reason, a band-pass filter 47 is provided downstream of the adder 34.

In FIG. 13, the band-pass filter 47 is connected to the adder stage 34 of the embodiment of FIG. 5. Similarly to the foregoing embodiment of FIG. 5, the gain deriving stage 32 derives the bounding and rebounding acceleration dependent value by multiplying the bounding and rebounding acceleration indicating sensor signal value $\alpha$ by the given gain Km. On the other hand, the arithmetic stage 33 integrates the bounding and rebounding acceleration indicating sensor signal value to derive the stroke speed Vs. The stroke speed Vs is multiplied by the given gain value Kn to derive the bounding and rebounding stroke speed indicating value.

Figure 14:
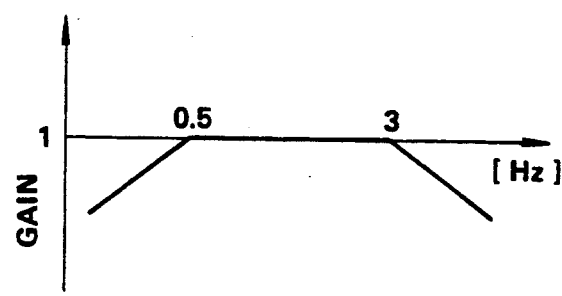
FIG. 14 is a chart showing operation of a band-pass filter employed in the control section of FIG. 13.

The band-pass filter 47 to be employed in the shown embodiment provides a pass band in a range of 0.5 Hz to 3 Hz for covering the resonance frequency of range of the vehicle. Therefore, as shown in FIG. 14, suspension control signal level is cut in a range out of the resonance frequency range. Therefore, the suspension control signal level in response to the vibration in a range out of the resonance frequency range can be substantially reduced. This eliminates the possibility of erroneous operation of the active suspension control due to low frequency range noise due to offset, drift of the bounding and rebounding acceleration sensors 29FL, 29FR, 29RL and 29RR. On the other hand, since the relatively high frequency vibration in a frequency range higher than resonance frequency range is generally caused by vibration of the suspension member, the rough ride feeling can be avoided by reducing the level of the suspension control signal in response to the vibration having the frequency higher than the resonance frequency range.

This embodiment is also advantageous in view of consumption of electricity since the occurrence of suspension control is reduced.

Though the shown first to third embodiments of the active suspension control systems employs the feature of deriving the bounding and rebounding stroke speed by integrating the bounding and rebounding acceleration, it would be possible to use stroke sensors for monitoring the stroke speed.

Figure 15:
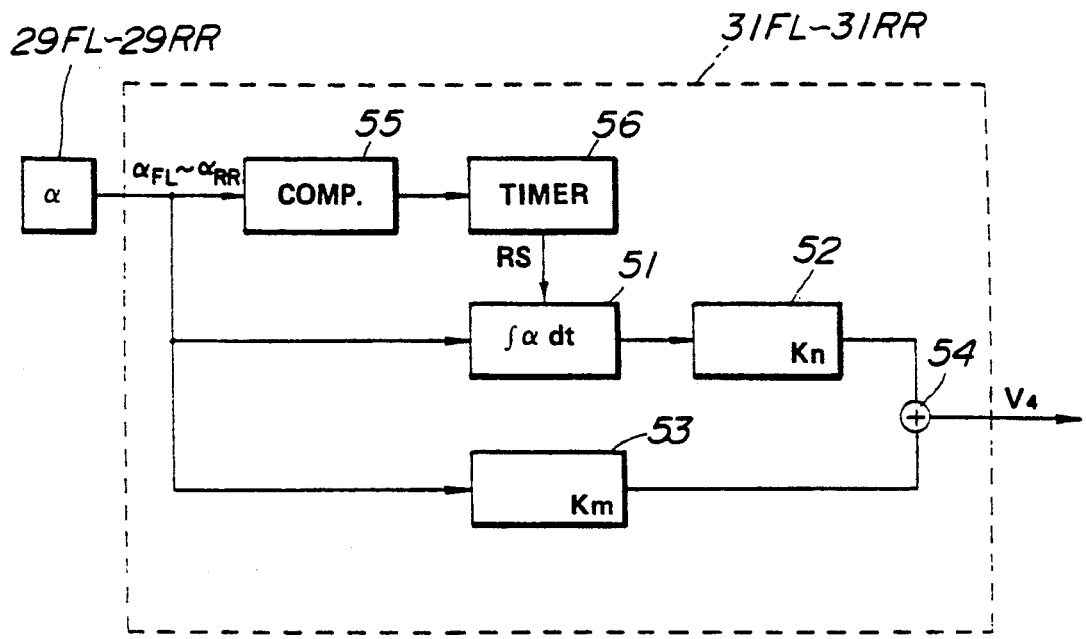
FIG. 15 is a schematic block diagram of the fourth embodiment of the control section in the controller of the active suspension control system according to the invention.

FIG. 15 shows the fourth preferred embodiment of the active suspension control system, according to the invention. In this embodiment, each of the front-left, front-right, rear-left and rear-right control sections 31FL, 31FR, 31RL and 31RR comprises an integrator circuit 51, an amplifier circuit 52, an amplifier circuit 53, an adder circuit 54, a comparator circuit 55 and a timer circuit 56. The amplifier circuits 53 and 52 have given amplifier gains Km and Kn. The amplifier circuit 53 receives the bounding and rebounding acceleration indicating sensor signal to amplify the input signal with the given amplifier gain Km to output the bounding and rebounding acceleration dependent value. On the other hand, the integrator circuit 51 integrates the bounding and rebounding acceleration indicating sensor signal to output the bounding and rebounding stroke speed indicating value. The bounding and rebounding stroke speed indicating value is amplified by the amplifier 52 with the amplifier gain Kn.

The comparator circuit 55 and the timer circuit 56 are provided for resetting the integrated bounding and rebounding stroke speed indicating value in the integrator circuit 51 when a predetermined reset condition is satisfied. The comparator circuit 55 is designed to check whether the bounding and rebounding acceleration indicating sensor signal value $\alpha$ is within a given acceleration range. When the bounding and rebounding acceleration indicating sensor signal value $\alpha$ is within the given acceleration range, the comparator signal of the comparator circuit 55 is held at a HIGH level. On the other hand, while the bounding and rebounding acceleration indicating sensor signal value o is out of the given acceleration range, the comparator signal level is held LOW. The timer circuit 56 is active while the comparator signal is held at a HIGH level. The timer circuit 56 measures an elapsed time while the comparator signal is held at a HIGH level to output a reset signal for resetting the integrated bounding and rebounding stroke speed indicating value when the timer value becomes greater than or equal to a given timer threshold.

Figure 16:
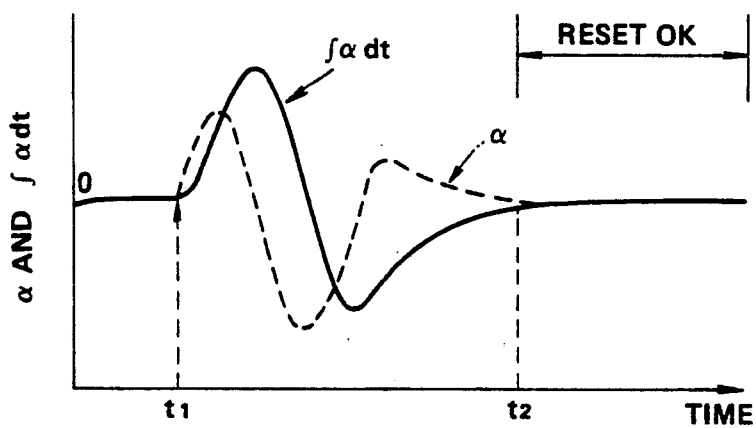
FIG. 16 is a timing chart showing the operation of the control section in response to bouncing motion of the vehicle body.

The operation of the foregoing fourth embodiment of the active suspension control system of FIG. 15 will be described with reference to FIG. 16. While the vehicle travels along a smooth road without causing vehicular attitude change, the bounding and rebounding acceleration indicating sensor signal value is maintained substantially zero, as shown by the broken line in FIG. 16. Therefore, the integrated bounding and rebounding stroke speed indicating value Vs is maintained substantially zero. At this time, since the bounding and rebounding acceleration indicating sensor signal value $\alpha$ is maintained within the given acceleration range, the comparator circuit 55 maintains a HIGH level comparator signal. Therefore, the timer circuit 56 is held in an active state to measure the elapsed time so that the reset signal may be output when the elapsed time reaches the given timer threshold.

In the shown example, the vehicular attitude change occurs by running over a projection on the road, at a time $t_1$ to vary the bounding and rebounding acceleration indicating signal value form zero. At this time, because the suspension member moves upwardly to cause upward movement of the vehicle body, the bounding and rebounding acceleration indicating sensor signal value $\alpha$ becomes positive value. Accordingly, the integrated bounding and rebounding stroke speed indicating value Vs increases as illustrated by the solid line, with a given delay time.

At this time, since the bounding and rebounding acceleration indicating value becomes greater than the given acceleration range, the comparator signal of the comparator circuit 55 turns to a LOW level. Therefore the timer circuit 56 becomes inactivated to reset the timer signal value. While the bounding and rebounding acceleration indicating sensor signal value $\alpha$ is out of the given acceleration range, the comparator signal level is held LOW to maintain the timer circuit 56 inactivated. Therefore, the integrated bounding and rebounding stroke speed indicating value will never reset at this period. Therefore, the bounding and rebounding stroke speed indicating value can be maintained so that the bounding and rebounding stroke speed dependent value can be derived for performing the active suspension control with the sum of he bounding and rebounding acceleration dependent value and the bounding and rebounding stroke speed dependent value. In this manner, active suspension control is suitably and timely performed to provide effective vibration stabilization, because the integrated value stored in the integrator circuit 51 is not reset when a vehicular attitude change occurs.

At a time $t_2$, the vibration of the vehicle body due to running over the projection is completely stabilized, the bounding and rebounding acceleration indicating sensor signal value becomes substantially zero to cause a HIGH level comparator signal. Therefore, the timer starts measurement of the elapsed time. After the timer value reaches the given timer threshold, the reset signal is output to the integrator circuit 51 to cause resetting of the integrated value. This is successful in avoiding the influence of the noise to be superimposed on the bounding and rebounding acceleration indicating sensor signal to cause drift.

Figure 17:
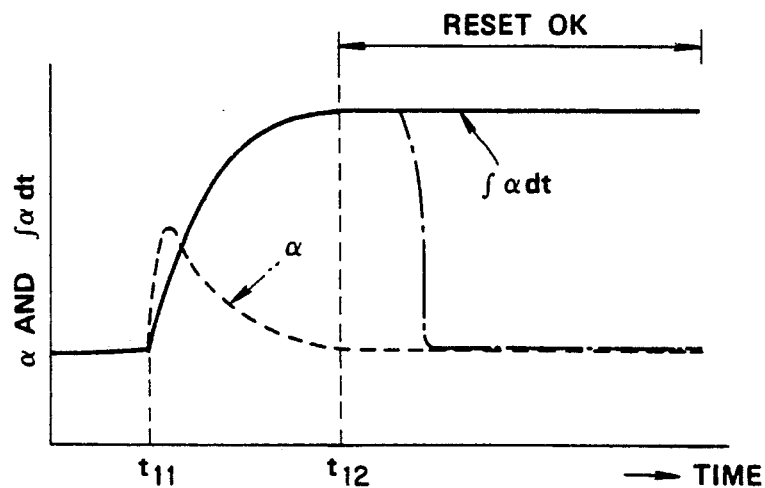
FIG. 17 is a timing chart showing the operation of the control section in response to pitching motion of the vehicle body in up-hill climbing.

Similarly, when the vehicle travels up-hill, and the front wheels start hill-climbing at a time $t_1$, the bounding and rebounding acceleration indicating value $\alpha$ is temporarily increased as shown in FIG. 17. Therefore, the integrated bounding and rebounding stroke speed indicating value increases according to increasing of the bounding and rebounding acceleration indicating signal value. After this, at a time $t_2$, the rear wheels start hill-climbing, the bounding and rebounding acceleration indicative sensor signal value $\alpha$ returns to substantially zero. Therefore, at the time $t_2$, the comparator signal level turns from LOW level to HIGH level. The timer circuit 56 is responsive to the HIGH level comparator signal from the comparator circuit to become active. The timer circuit 56 thus starts measurement of the elapsed time to output the rest signal after the elapsed time reaches the given timer threshold.

In the latter case, the shown embodiment of the active suspension control system suppresses the attitude change of the vehicle body at the beginning of the hill-climbing so that the vehicle can be smoothly driven through the up-hill and/or down-hill.

Figure 18:
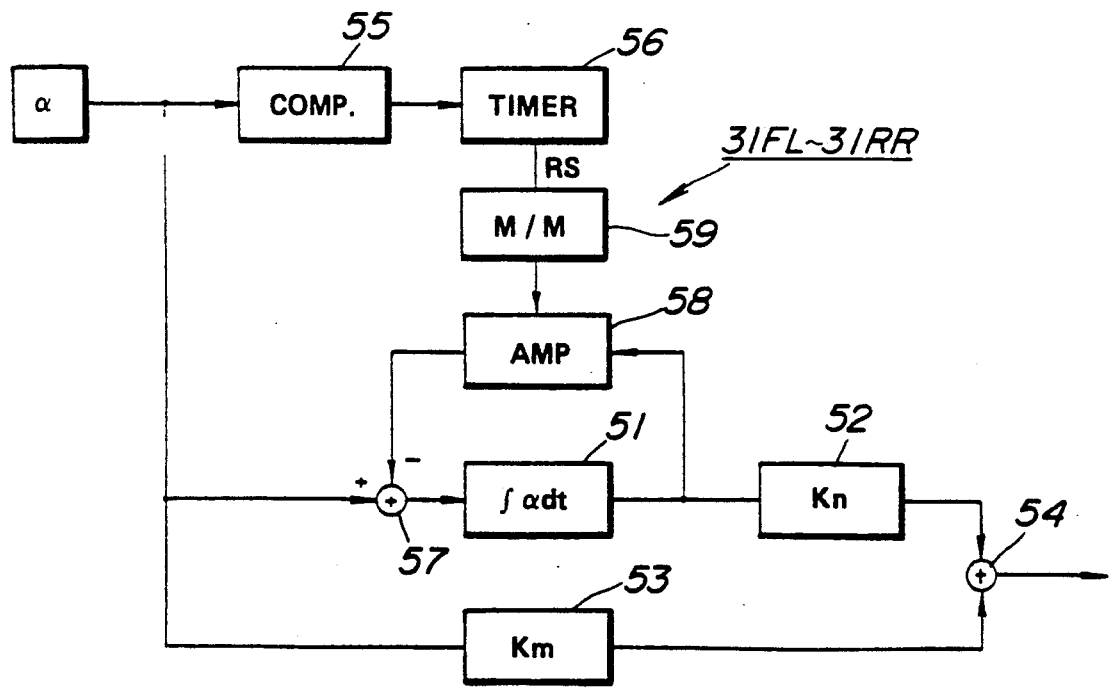
FIG. 18 is a modification of the fourth embodiment of the control section in the controller of the active suspension control system according to the invention.

It should be appreciated that, though the shown embodiment resets the integrated value in the integrator while the vehicle travels on a smooth road and driving activity of the driver will not cause substantial change of the vehicular attitude, it would be possible to reset the integrated value in other manners. Namely, if the integrated value is instantly reset, substantial change of the suspension control signal will occur to cause substantial attitude change of the vehicle body. Therefore, in order to avoid such defect, a modification of the embodiment of FIG. 18 is proposed. In this modification, a monostable multivibrator 59 and a feedback amplifier 58 are provided in addition to the circuit of FIG. 15. The feedback amplifier 58 is connected to the output of the integrator circuit 51 to receive therefrom the bounding and rebounding stroke speed indicating value as output of the integrator. The output of the feedback amplifier 58 is connected to an adder circuit 57 which is disposed between the bounding and rebounding acceleration sensor and the integrator circuit 51. The adder circuit 57 has an inverted input terminal which is connected to the feedback amplifier 58.

The monostable multivibrator 59 is responsive to the reset signal from the timer circuit 56 to output a HIGH level signal for a given period of time. The HIGH level signal of the monostable multivibrator 59 serves as a trigger signal for the feedback amplifier 58 to activate the same. While activated, the feedback amplifier 58 amplifies the output of the integrator circuit 51 and feeds back to the adder circuit 57. Therefore, during the given period of time while the HIGH level signal from the monostable multivibrator 59 is maintained, the input to the integrator circuit 51 from the adder circuit 57 is gradually reduced to zero. This modification may avoid rapid change of the suspension control signal value and thus prevents the vehicle body from changing attitude due to rapid change of the suspension control signal value.

Though the foregoing embodiments required four bounding and rebounding acceleration sensors for monitoring the bounding and rebounding motions at respective front-left, front-right, rear-left and rear-right wheels, it is possible to utilize projected bounding and rebounding acceleration values for one or more of the vehicle body positions corresponding to the wheels. Examples of active suspension control system utilizing the projected bounding and rebounding acceleration has been illustrated in FIGS. 19, 21 and 23.

Figure 19:
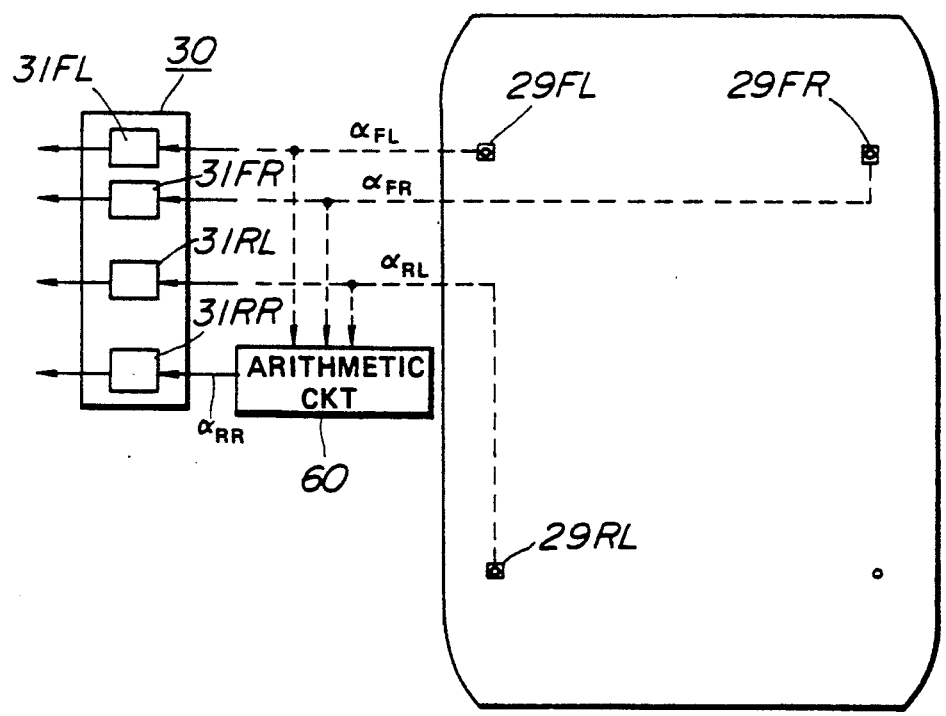
FIG. 19 is a modified embodiment of the active suspension control system, in which arrangement of the bounding and rebounding acceleration sensors is modified.
Figure 20:
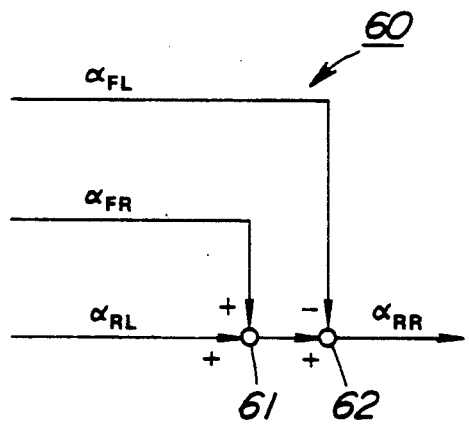
FIG. 20 is a block diagram showing the detail of an arithmetic circuit in FIG. 19.

In the example of FIG. 19, the bounding and rebounding acceleration sensor 29RR for monitoring the bounding and rebounding motion at the vehicle body section corresponding to the rear-right wheel is neglected. On the other hand, the suspension control system of FIG. 19 employs an arithmetic circuit 60 for projecting the bounding and rebounding acceleration at the rear-right wheel based on the bounding and rebounding accelerations at the front-left, front-right, rear-left bounding and rebounding acceleration indicating sensor signals $\alpha_{FL}$, $\alpha_{FR}$ and $\alpha_{RL}$. In order to enable the arithmetic circuit 60 to project the projected bounding and rebounding acceleration value based on the front-left, front-right, rear-left bounding and rebounding acceleration indicating sensor signals $\alpha FL$, $\alpha FR$ and $\alpha RL$, the arithmetic circuit 60 is connected to the front-left, front-right, rear-left bounding and rebounding acceleration indicating sensors 29FL, 29FR and 29RL. In practice, the arithmetic circuit 60 comprises a first adder 61 and a second adder 62, as seen in FIG. 20. The first adder 61 receives the front-right and rear-left bounding and rebounding acceleration indicating signals $\alpha FR$ and $\alpha RL$ to obtain the sum thereof. From the sum obtained in the first adder 61, the front-left bounding and rebounding acceleration indicating sensor signal value $\alpha FL$ is subtracted in the adder 62. The resultant value of the second adder 62 serves as the projected bounding and rebounding acceleration value of the vehicle body section corresponding to the rear-right wheel.

By the shown arrangement, if the vehicle causes winding-up, the bounding and rebounding acceleration indicating sensor signal values of the front-left and front-right bounding and rebounding acceleration sensors 29FL and 29FR become positive and the bounding and rebounding acceleration indicating sensor signal value $\alpha_{RL}$ becomes negative. At this time, the projected bounding and rebounding acceleration indicating value $\alpha_{RR}$ of the rear-right wheel may be illustrated as:

$$\alpha_{RR} = (-\alpha_{RL}) + (+\alpha_{FR}) - (+\alpha_{FL}) \ldots \quad (8)$$

Here since the $\alpha_{FR}$ and $\alpha_{FL}$ are positive values as set forth above, the projected value may become:

$$\alpha_{RR} = -\alpha_{RL} + \Delta\alpha$$

$\Delta\alpha$ is a difference between $\alpha_{FL}$ and $\alpha_{FR}$. As will be appreciated by this process, the bounding and rebounding acceleration satisfactorily close to the actual bounding and rebounding acceleration of the vehicle body section corresponding to the rear-right wheel can be obtained. Similarly, when the vehicle rolls inwards the left due to right-hand steering operation the bounding and rebounding acceleration indicating signal values $\alpha_{FR}$ of the front-right bounding and rebounding acceleration sensor 29FR becomes positive and the bounding and rebounding acceleration indicating signal values $\alpha_{FL}$ and $\alpha_{RL}$ of the front-left and rear-left bounding and rebounding acceleration sensors 29FL and 29RL become negative. In this case, the projected rear-right bounding and rebounding acceleration value $\alpha_{RR}$ may be illustrated as:

$$\alpha_{RR} = (-\alpha_{RL}) + (+\alpha_{FR}) - (-\alpha_{FL}) \ldots \quad (8)$$

Here since the $\alpha_{FL}$ and $\alpha_{RL}$ are negative values as set forth above, the projected value may become:

$$\alpha_{RR} = \alpha_{FR} + \Delta\alpha'$$

$\Delta\alpha'$ is difference of $\alpha_{FL}$ and $\alpha_{RL}$. With the foregoing process, the projected value of the rear-right bounding and rebounding acceleration may be a substantially close value to that of the actual bounding and rebounding acceleration value.

Figure 21:
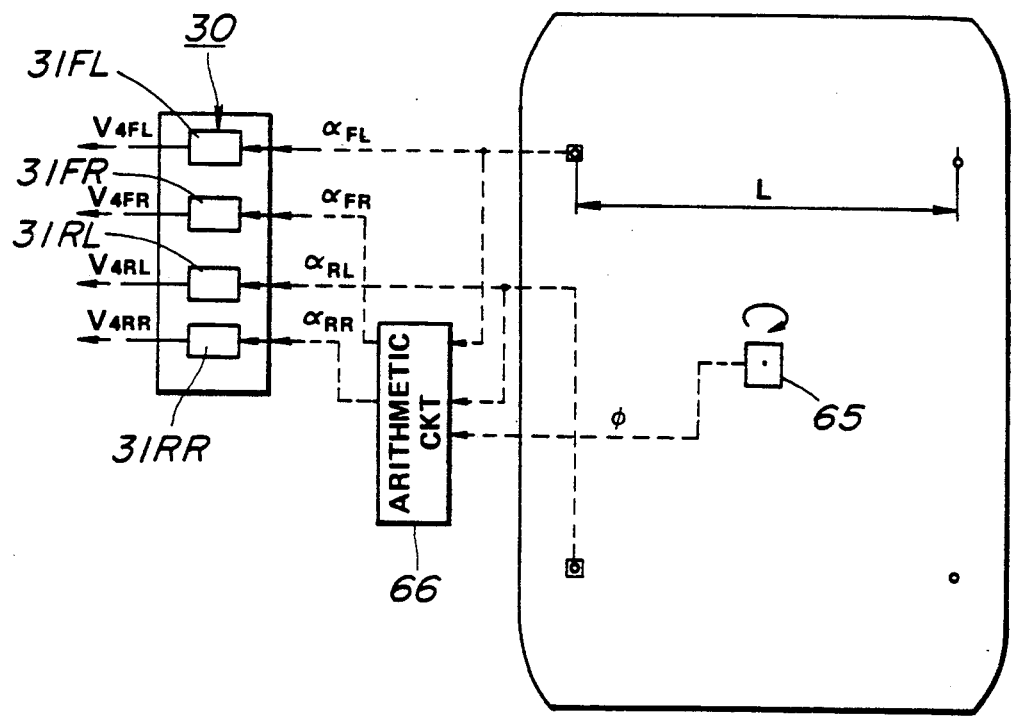
FIG. 21 is a modified embodiment of the active suspension control system, in which arrangement of the bounding and rebounding acceleration sensors is modified.
Figure 22:
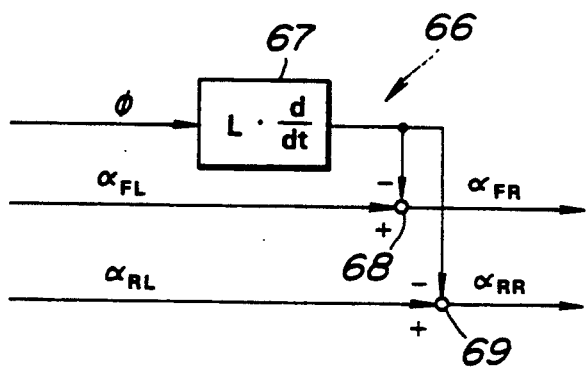
FIG. 22 is a block diagram showing the detail of an arithmetic circuit in FIG. 21.

FIG. 21 shows another embodiment which neglects front-right and rear-right bounding and rebounding acceleration sensors 29FR and 29RR. On the other hand, the example of FIG. 21 employs a rolling rate sensor 65 at an intersection of extensions extending between the front-left wheel and rear-right wheel, and the front-right wheel and the rear-left wheel. As the rolling rate sensor a kind of road cell disclosed in the U.S. Pat. No. 4,312,453 can be utilized, for example. The rolling rate sensor 65 generally measures shifting magnitude and shifting direction of the gravity center to produce a rolling rate indicating signal $\phi$. An arithmetic circuit 66 is also provided in order to determine the projected front-right and rear-right acceleration values $\alpha_{FR}$ and $\alpha_{RR}$ based on the front-left and rear-left bounding and rebounding acceleration indicating sensor signal values $\alpha_{FL}$ and $\alpha_{RL}$ and the rolling rate indicating signal value $\phi$. As shown in FIG. 22, the arithmetic circuit includes a rolling rate dependent value derivation circuit 67, a first adder 68 and a second adder 69.

The rolling rate dependent value derivation circuit derives a differentiated value $d\phi/dt$ of the rolling rate indicating signal value $\phi$. The differentiated value $d\phi/dt$ is multiplied with a distant L between the positions of the front-left and front-right wheels. The resultant rolling rate dependent value is subtracted from the front-left bounding and rebounding acceleration indicating sensor signal value $\alpha_{FL}$ of the front-left bounding and rebounding acceleration sensor 29FL in the first adder 68. Similarly, the resultant rolling rate dependent value is subtracted from the rear-left bounding and rebounding acceleration indicating sensor signal value $\alpha_{RL}$ of the rear-left bounding and rebounding acceleration sensor 29RL in the second adder 69. In this case the output value of the first adder 68 serves as the projected front-right bounding and rebounding acceleration indicating value $\alpha_{FR}$ and the output value of the second adder 69 serves as the projected rear-right bounding and rebounding acceleration indicating value $\alpha_{RR}$.

Therefore, the projected front-right and rear-right bounding and rebounding acceleration indicating values $\alpha_{FR}$ and $\alpha_{RR}$ are respectively illustrated by the following equations (9) and (10):

$$\alpha_{FR} = \alpha_{FL} - L \cdot d\phi/dt \ldots \quad (9)$$

$$\alpha_{RR} = \alpha_{RL} - L \cdot \omega d/dt \ldots \quad (10)$$

Figure 23:
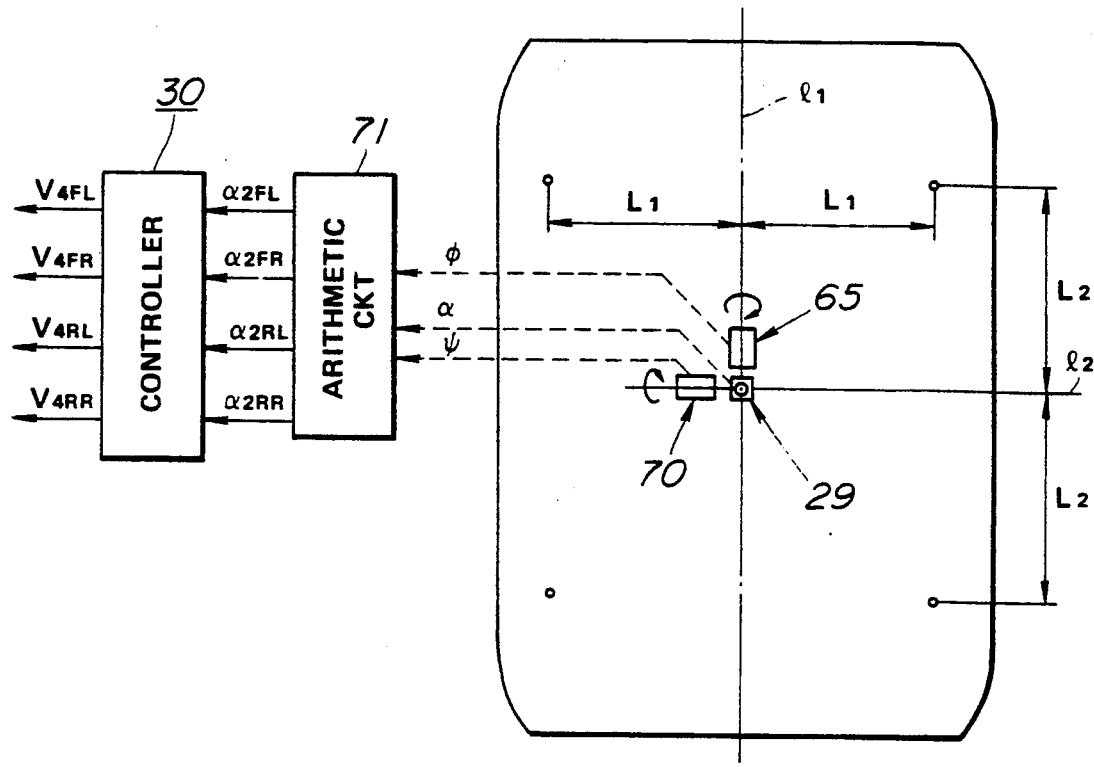
FIG. 23 is a modified embodiment of the active suspension control system, in which arrangement of the bounding and rebounding acceleration sensors is modified.
Figure 24:
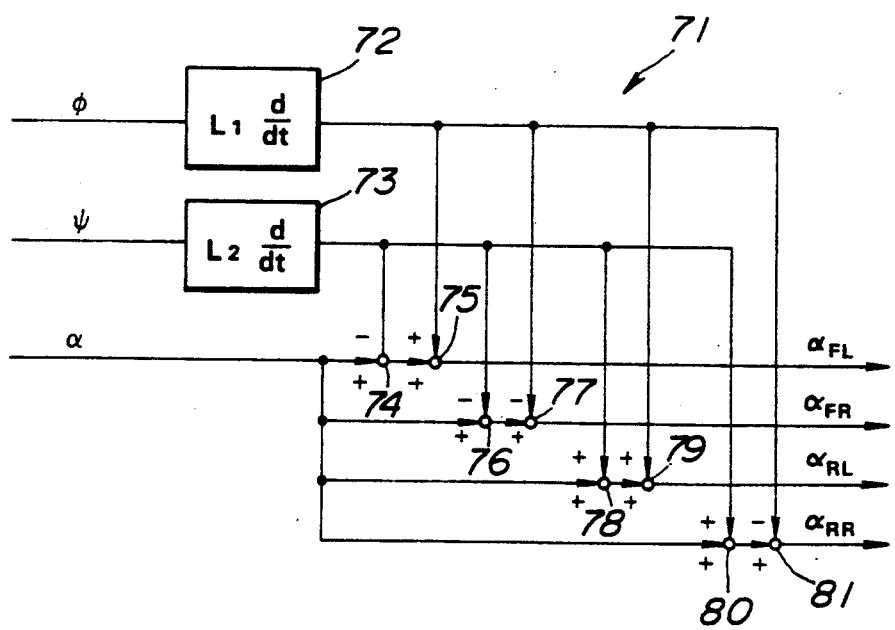
FIG. 24 is a block diagram showing the detail of an arithmetic circuit in FIG. 23.

FIG. 23 shows a further example in which the bounding and rebounding acceleration sensor 29 is provided at the position corresponding to the gravity center of the vehicle. A pitching rate sensor 70 is provided in addition to the rolling rate sensor 65. In this case, the bounding and rebounding acceleration sensor 29 monitors bounding and rebounding motion at the gravity center to produce the bounding and rebounding acceleration indicating sensor signal. In this embodiment, the rolling rate sensor 65 monitors lateral offset of the gravity center to output the rolling rate indicating signal $\phi$ representative of the offset magnitude and offset direction of the gravity center in lateral direction. On the other hand, the pitching rate sensor 70 monitors offset magnitude and offset direction of the gravity center in the longitudinal direction to output the pitching rate indicating signal $\psi$.

An arithmetic circuit 71 receives the bound and rebound acceleration indicating signal $\alpha$, the rolling rate indicating signal $\phi$ and the pitching rate indicative signal $\psi$. The arithmetic circuit 71 includes a rolling rate dependent value derivation circuit 72 and a pitching rate dependent value derivation circuit 73. The rolling rate dependent value derivation circuit 72 receives the rolling rate indicating signal $\phi$ to derive differentiated value $d\phi/dt$. The differentiated value $d\phi/dt$ is multiplied with the L indicative of the lateral distance $L_1$ from the gravity center to respective wheels. On the other hand, the pitching rate dependent value derivation circuit 73 derives the differentiated value $\psi d/dt$ of the pitching rate indicating signal $\psi$. The resultant differentiated value $\psi d/dt$ is multiplied with a longitudinal distance $L_2$ from the gravity center to respective wheels.

The arithmetic circuit 71 further includes adders 74, 75, 76, 77, 78, 79, 80 and 81. The adder 74 receives the bounding and rebounding acceleration indicating value $\alpha$ and subtracts therefrom the output of the pitching rate dependent value derivation circuit 73. The adder 75 receives the output value of the adder 74 to add the output value of the rolling rate dependent value derivation circuit 72. The adder 76 receives the bounding and rebounding acceleration indicating value α and subtracts therefrom the output of the pitching rate dependent value derivation circuit 73. The adder 77 receives the output value of the adder 76 to subtract therefrom the output value of the rolling rate dependent value derivation circuit 72. The adder 78 receives the bounding and rebounding acceleration indicating value α and adds thereto the output of the pitching rate dependent value derivation circuit 73. The adder 79 receives the output value of the adder 78 to add the output value of the rolling rate dependent value derivation circuit 72. The adder 80 receives the bounding and rebounding acceleration indicating value α and adds thereto the output of the pitching rate dependent value derivation circuit 73. The adder 81 receives the output value of the adder 80 to subtracts therefrom the output value of the rolling rate dependent value derivation circuit 72.

Therefore, the bounding and rebounding accelerations at respective front-left, front-right, rear-left and rear-right wheels are illustrated by the following equations:

$$a_{FL} = \alpha - L_2 \cdot d\psi/dt + L_1 \cdot d\phi/dt \ldots \quad (11)$$

$$a_{FR} = \alpha - L_2 \cdot d\psi/dt - L_1 \cdot d\phi/dt \ldots \quad (12)$$

$$a_{RL} = \alpha + L_2 \cdot \psi d/dt + L_1 \cdot \phi d/dt \ldots \quad (13)$$

$$a_{RR} = \alpha L_2 \cdot d\psi/dt - L_1 \cdot d\phi/dt \ldots \quad (14)$$

Therefore, with this arrangement, the bounding and rebounding acceleration satisfactorily close to the actual acceleration at respective wheel positions can be obtained with single acceleration sensor.

It should be appreciated, though the present invention has been disclosed in terms of the preferred embodiments employing the hydraulic cylinders for controlling suspension characteristics, the invention may be applicable for any type of suspension systems which have adjustable damping characteristics. For example, the present invention may be applicable for pneumatic suspension systems and hydropneumatic suspension systems. Positions of the sensors are not limited to the shown positions and can be at any desired positions.

What is claimed is:

1. An actively controlled suspension system for an automotive vehicle comprising:
   a suspension assembly including a variable pressure chamber filled with a working fluid, said variable pressure chamber including a fluid operated cylinder;
   a pressure source connected to said fluid operated cylinder for supplying pressurized working fluid;
   pressure adjusting means, interposed between said fluid operated cylinder and said pressure source, for adjusting fluid pressure in said fluid operated cylinder;
   sensor means for monitoring vehicular attitude for producing a vehicular attitude indicating signal;
   a controller, receiving said vehicular attitude indicating signal, for deriving a control signal to suppress attitude change of said vehicle for controlling said pressure adjusting means;
   said suspension assembly including a suspension member rotatably supporting a vehicular wheel, and said fluid operated cylinder being disposed between said suspension member and a corresponding section of a vehicle body, said fluid operated cylinder varying fluid pressure therein in response to relatively high frequency vibration input from said suspension member in order to absorb vibration energy;
   said sensor means being provided on said vehicle body for monitoring an acceleration of bounding and rebounding, absolute motion of said vehicle body for producing a bounding and rebounding absolute motion acceleration indicating signal as said vehicular attitude indicating signal;
   said controller deriving a bounding and rebounding absolute motion speed based on said bounding and rebounding absolute motion acceleration indicating signal and detecting the vehicular attitude change based on said bounding and rebounding absolute motion acceleration and said bounding and rebounding absolute motion speed for deriving said control signal; and
   said control signal from said controller being generated in a manner to linearly vary with regard to the sum of a bounding and rebounding acceleration based on said bounding and rebounding absolute motion acceleration indicating signal and a first gain and a bounding and rebounding speed based on said bounding and rebounding absolute motion speed indicating signal and a second gain, both of said acceleration and speed being monitored on a corresponding suspended section, such that damping force characteristics of said fluidf operated cylinder are unaffected by a relatively high frequency vibration input from said suspension member, so as to maintain optimal vehicular attitude.

2. An actively controlled suspension system as set forth in claim 1, wherein said controller derives said bounding and rebounding motion speed by intergrating said bounding and rebounding acceleration indicating signal value.

3. An actively controlled suspension system as set forth in claim 2, which further comprises a reset signal generator means associated with said controller, said reset signal generator means detecting a vehicular driving condition satisfying a predetermined reset condition for outputting a reset signal for resetting said integrated value of said bounding and rebounding acceleration indicating signal value.

4. An actively controlled suspension system as set forth in claim 1, wherein said controller derives a bounding and rebounding acceleration dependent component of said control signal based on said bounding and rebounding acceleration indicating signal value and a given first gain and a bounding and rebounding motion speed dependent component of said control signal based on said bounding and rebounding motion speed and a given second gain.

5. An actively controlled suspension system as set forth in claim 4, wherein said control signal is a sum of said bounding and rebounding acceleration dependent component and said bounding and rebounding motion speed dependent component.

6. An actively controlled suspension system as set forth in claim 5, which further comprises a manually operable means for adjusting at least one of said first and second gains.

7. An actively controlled suspension system for an automotive vehicle, said suspension system comprising:

a suspension assembly including a fluid pressure operated cylinder filled with working fluid;

a pressure source connected to said fluid pressure operated cylinder to supply said working fluid under pressure;

a pressure control valve, interposed between said fluid pressure operated cylinder and said pressure source, to adjust fluid pressure in said fluid pressure operated cylinder;

sensor means, provided on a vehicle body, for monitoring essentially vertical absolute motion of each suspended section where one of a plurality of vehicular wheels is suspended, said sensor means producing vertical absolute motion indicating signals respectively indicative of vertical absolute motion at respective suspended sections;

a controller, receiving said vertical absolute motion indicating signals, to generate control signals to independently control fluid pressure in each of said fluid pressure operated cylinders to suppress attitude change of said vehicle;

each suspension assembly including a suspension member rotatably supporting a vehicular wheel, and each fluid pressure operated cylinder being disposed between said suspension member and a corresponding one of suspended sections of said vehicle body;

said controller deriving a bounding and rebounding absolute motion acceleration and a bounding and rebounding absolute motion speed at each suspended section of said vehicle on the basis of said vertical absolute motion indicating signals; and each of said control signals from said controller being generated in such a manner as to linearly vary with respect to a sum of a vertical acceleration dependent component based on said bounding and rebounding absolute motion acceleration and a first gain and a vertical speed dependent component based on said bounding and rebounding absolute motion speed and a given second gain, both said bounding and rebounding absolute motion acceleration and speed being monitored on a corresponding suspended section, such that damping force characteristics of said fluid pressure operated cylinder are unaffected by a relatively high frequency vibration input from said suspension member, to maintain optimal vehicular attitude.

8. An actively controlled suspension system as set forth in claim 7, wherein both said first gain for said bounding and rebounding absolute motion acceleration and said second gain for said bounding and rebounding absolute motion speed are variable.

9. An actively controlled suspension system as set forth in claim 8, wherein said controller includes an integrator circuit to derive an output signal representative of said bounding and rebounding absolute motion speed from said bounding and rebounding absolute motion acceleration.

10. An actively controlled suspension system as set forth in claim 9, wherein said controller includes a timer circuit to reset bounding and rebounding absolute motion speed data stored in said integrator circuit only when monitored bounding and rebounding absolute motion acceleration is less than or equal to a predetermined threshold acceleration for a preset time interval.

11. An actively controlled suspension system as set forth in claim 10, wherein said timer circuit achieves resetting of said bounding and rebounding absolute motion speed data at a preset period of time.

* * * * *